Oct. 11, 1966 S. P. NEWBERRY 3,278,679

ELECTRON-OPTICAL READOUT OF LATENT ELECTROSTATIC IMAGE

Filed June 13, 1963 4 Sheets-Sheet 1

Inventor:
Sterling P. Newberry,
by Charles W. Helzer
His Attorney.

Oct. 11, 1966 S. P. NEWBERRY 3,278,679

ELECTRON-OPTICAL READOUT OF LATENT ELECTROSTATIC IMAGE

Filed June 13, 1963

4 Sheets-Sheet 2

Inventor:
Sterling P. Newberry,
by Charles W. Helzer
His Attorney.

ELECTRON-OPTICAL READOUT OF LATENT ELECTROSTATIC IMAGE

Filed June 13, 1963 4 Sheets-Sheet 3

Inventor:
Sterling P. Newberry,
by Charles W. Helzer
His Attorney.

Oct. 11, 1966 S. P. NEWBERRY 3,278,679

ELECTRON-OPTICAL READOUT OF LATENT ELECTROSTATIC IMAGE

Filed June 13, 1963 4 Sheets-Sheet 4

Inventor:
Sterling P. Newberry,
by Charles W. Helzer
His Attorney.

3,278,679

ELECTRON-OPTICAL READOUT OF LATENT ELECTROSTATIC IMAGE

Sterling P. Newberry, Schenectady, N.Y., assignor to General Electric Company, a corporation of New York Filed June 13, 1963, Ser. No. 287,565
20 Claims. (Cl. 178—6.6)

Figures 1, 1A, 1B, 2:
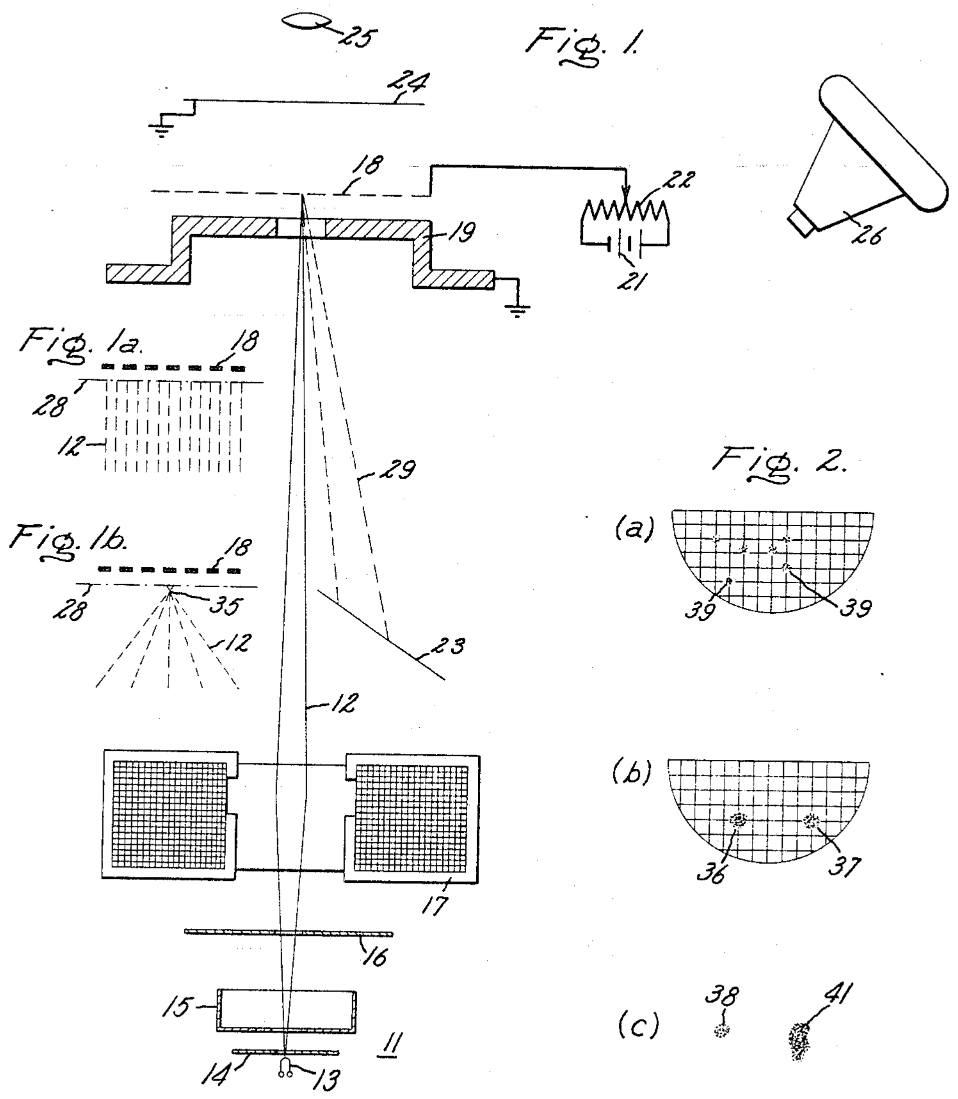

The present invention relates primarily to a new and improved method and apparatus for reading out information stored on a data record member in the form of electrical charges arranged in predetermined intelligence conveying patterns.

Additionally, the invention makes possible a new and improved write-read apparatus for both recording and reading out information recorded on a data record member in the form of electrical charges arranged in predetermined intelligence conveying patterns, and with which one can readily convert from a writing mode of operation to a reading mode, and vice versa, by simple voltage changes.

Applicant's assignee has recently developed and made available to the government and industry a technique of information recording wherein electrical charge patterns are written on a thermoplastic film recording medium in intelligence conveying patterns. In this technique of information recording (known as thermoplastic recording) after a writing operation whereby electrical charges are written on the thermoplastic recording medium in intelligence conveying patterns by means of an electron writer, the surface of the thermoplastic recording medium is heated to a substantial molten condition. Upon this occurrence, electrostatic field forces acting on the charges in the charge patterns causes them to physically deform the molten surface of the thermoplastic film in accordance with the predetermined intelligence conveying patterns. Thereafter, upon the surface of the thermoplastic recording medium being allowed to cool, the physical deformations are permanently set to thereby form a permanent record of the information or intelligence contained in the patterns. The information thus recorded may be subsequently retrieved by known optical readout techniques, and/or known electron beam readout techniques which require striking the physically deformed surface of the thermoplastic film recording medium with a primary readout beam of electrons. Because the intelligence has been permanently preserved in the form of physical deformations in the surface of the thermoplastic recording medium, these known readout techniques are nondestructive of the information stored, and are quite satisfactory for many applications.

It should be noted, however, with respect to the above described technique of information recording on thermoplastic film, that subsequent to the fixation of the electric charge patterns by heating and then cooling the surface of the thermoplastic recording medium, the electric charge pattern is still present on the deformed surface of the thermoplastic recording medium in the form of a latent electrostatic image. This latent electric charge pattern may be sensed and read out nondestructively by the method and apparatus herein disclosed to thereby retrieve the information recorded. Additionally, it is important to note that the method and apparatus of the present invention may be used to read out latent electric charge patterns on the surface of the recording medium without requiring permanent fixation by the heating and cooling operation mentioned above. Further, it should be noted that the manner in which the latent electric charge pattern is recorded on the surface of the data record member does not affect the operation of the readout technique made possible by the present invention.

Such intelligence conveying charge patterns may be recorded in an in-air recording method by means of photoconductors, or may be recorded by means of an electron beam writing technique as will be described hereinafter, and readout by means of the present invention would be equally efficacious. It should also be noted that the present invention makes immediate readout possible. This is known as "echo readout," in that readout can be achieved immediately after recording without requiring an intermediate heating or other step. It is therefore a primary object of the present invention to provide a new and improved method and apparatus for reading out information stored on a data record member in the form of intelligence conveying electric charge patterns in a manner such that the data record is not destroyed during the readout process.

Another object of the invention is to provide a new and improved write-read apparatus for recording and reading out information recorded on a data record member in the form of electric charge patterns wherein it is easy to convert from a writing mode to a reading mode by simple voltage changes applied to the apparatus.

Another object of the invention is to provide a new and improved readout method for retrieving information stored in the form of electric charge patterns which does not require an optically transparent member upon which it is recorded.

Still another object of the invention is to provide a new and improved method of recording and reading out electric charge patterns recorded on an insulating member which does not require permanent fixation by heating of the charges in order to be read out nondestructively.

A further object of the invention is to provide a new and improved method of reading out information recorded in the form of electric charge patterns on an insulating surface which provides a magnified display of the information thus recorded, thereby resulting in greatly improved resolving power.

A still further object of the invention is to provide a new and improved write-read apparatus which can be used to inspect the condition of a conducting substrate that might be an integral part of the recording member upon which the electric charge patterns to be read out are recorded.

In practicing the invention, a new and improved method is provided for reading out information stored on a surface in the form of a latent electrostatic image. This readout method is achieved with a scanning electron mirror microscope, and comprises connecting the data record member having the latent electrostatic image stored thereon as the anticathode of the scanning electron mirror microscope. The surface of the data record member is then scanned with a finely focussed electron beam in time sequence in accordance with a predetermined pattern, with the finely focussed electron beam being adjusted to a value such that a mirror reflection action occurs prior to the electrons of the beam striking the anticathode surface. The reflected or turned around electrons resulting from the mirror reflection action are representative of the potential variations at the turn around points in the turn around plane of the time sequential scanning electron beam. These turned around or reflected electrons are focussed upon a substantial image plane, and at the image plane are converted to a time varying output electric signal which is representative of the variations in the latent electrostatic image.

In practicing the invention, a write-read scanning mirror electron apparatus is provided which includes in combination an electron gun for projecting a beam of electrons having a predetermined energy level. First focussing means are positioned adjacent the projected path of the beam of electrons for focussing the beam of electrons in a desired manner. Second focussing means are positioned adjacent the projected path of the beam of electrons at a point further from the electron gun than the first focussing means. A target specimen having a selectively charged surface is positioned in the projected path of the beam of electrons substantially at right angles thereto at a point further removed from the electron gun than the second focussing means. The first and second focussing means coact to focus the electron beam to a fine point on a turn around plane slightly disposed from the target specimen towards the electron gun. Means are provided for applying a reversing potential to the specimen whereby mirror action on the beam of electrons will take place to cause the beam of electrons to be turned around at a turn around point on a turn around plane prior to striking the target specimen. The second focussing means is located and adjusted to focus the turned around electrons upon a substantial image plane, and converting means are located generally at the image plane for converting variations of the turned around electron image into a detectable indication of variations in the target specimen. The basic apparatus is completed by means for evacuating the space through which the electrons travel between the electron gun, the target specimen and the converting means.

In addition to the above basic structure, the preferred form of read-write apparatus includes an electron gun having an electron source, a control grid and an accelerating anode electrode. A writing signal source and a control grid reading bias signal source are provided together with selective switching means for selectively connecting the control grid to the writing signal source or to the control grid reading bias signal source. A writing high voltage supply and a reading high voltage supply are provided together with selective switching means for selectively connecting the accelerating anode of the electron gun either to the writing high voltage supply or to the reading high voltage supply. A variable source of potential is operatively coupled to the target specimen which preferably comprises a thermoplastic film data record member for selectively applying an accelerating potential and a reversing potential to the data record member. A read-write control switch means is provided which interconnects all the selective switching means mentioned above, and the variable source of potential for selectively and simultaneously applying the writing signal to the control grid, a high voltage to the accelerating anode, and an accelerating potential to the data record during the writing operation. The selective switching means also operates to selectively and simultaneously supply the control grid reading bias signal to the control grid, the reading high voltage supply to the accelerating anode, and a reversing potential to the data record member during the reading operation of the apparatus.

In its preferred form, the target specimen comprises a data record member formed by a thermoplastic film recording medium supported over an electrically conducting surface that is in turn supported by a suitable insulating backing member with the thermoplastic film recording medium having electrical charges recorded thereon in intelligence conveying patterns. Scanning means are positioned adjacent the projected electron path intermediate to the electron gun and the data record for scanning the finely focussed electron beam over the surface of the data record member, and a scanning signal source is operatively coupled to the scanning means for controlling the action of the scanning means. And, means are provided for removing and replacing a data record member with a replacement data record member having different intelligence conveying patterns of electrical charges recorded thereon.

Figures 3, 7:
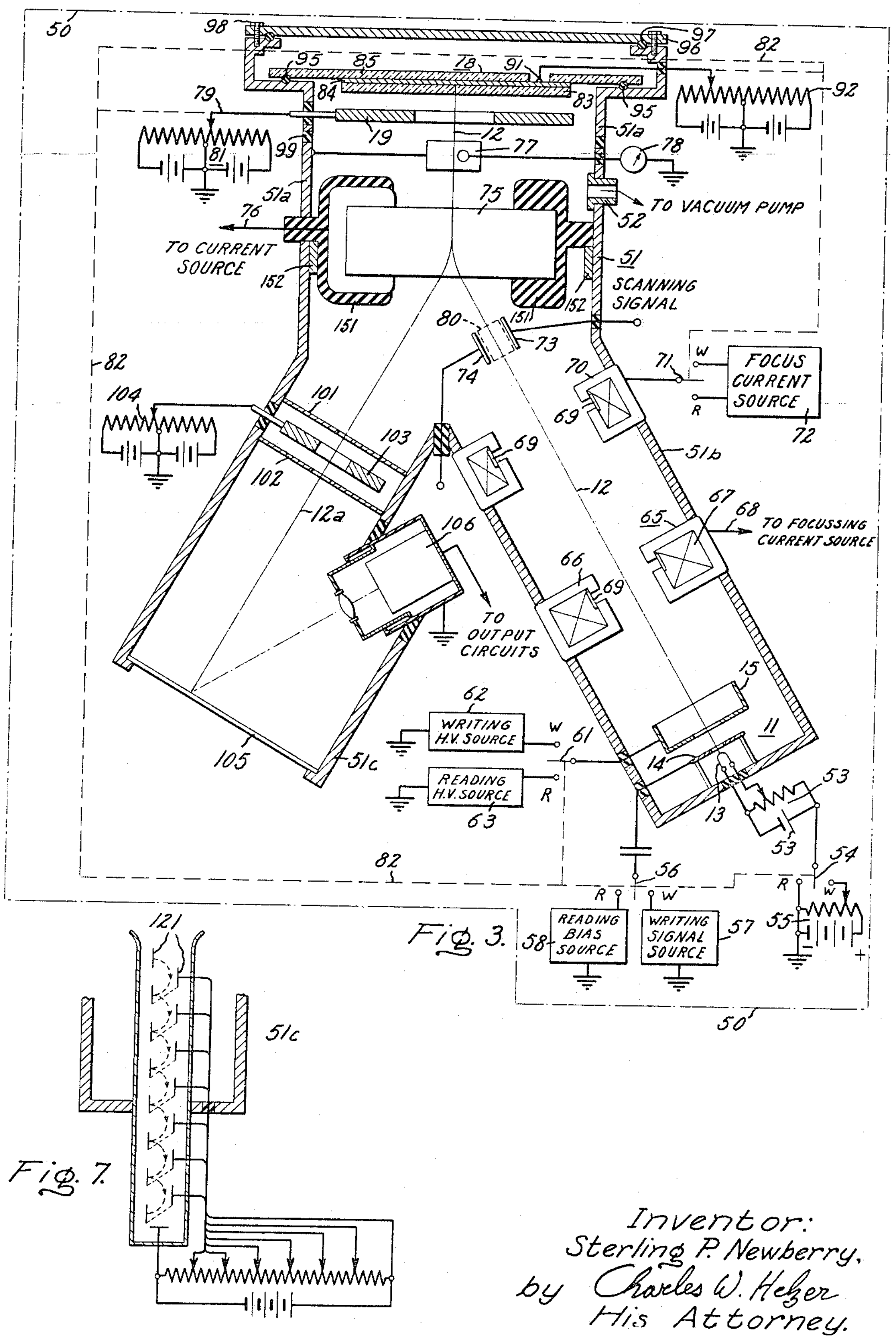
Figure 8:
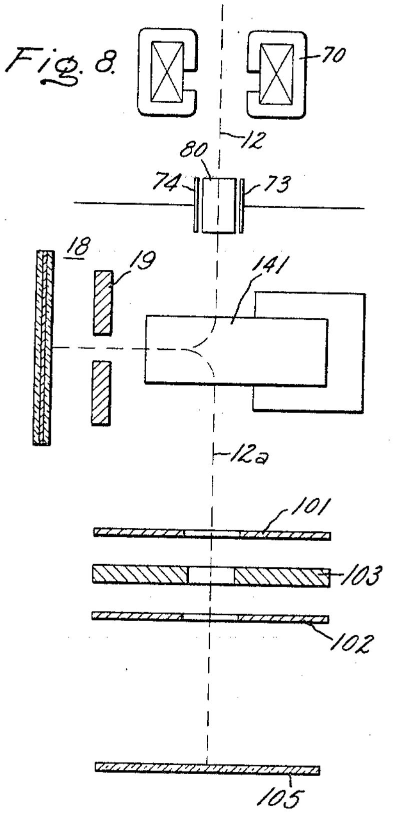
Figure 4A:
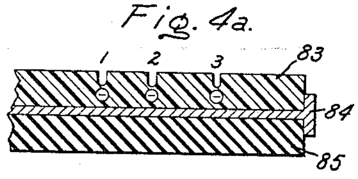
Figure 4B:
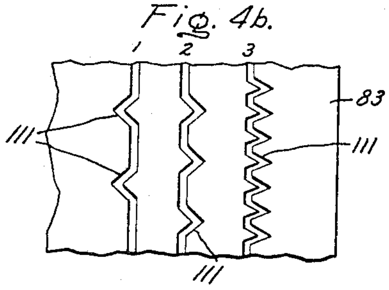
Figure 4C:
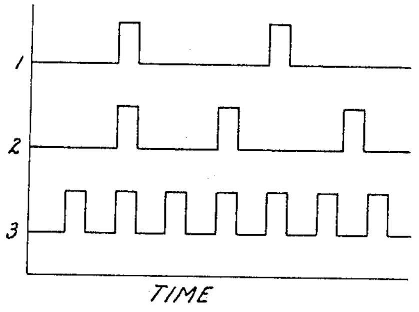
Figure 5A:
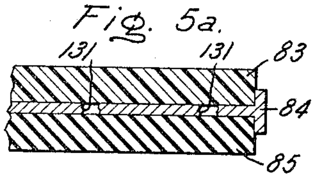
Figure 5B:
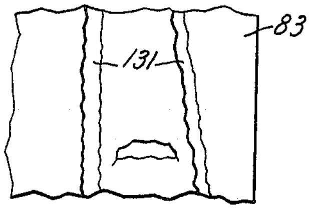
Figure 6A:
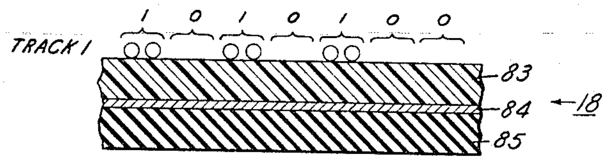
Figure 6B:
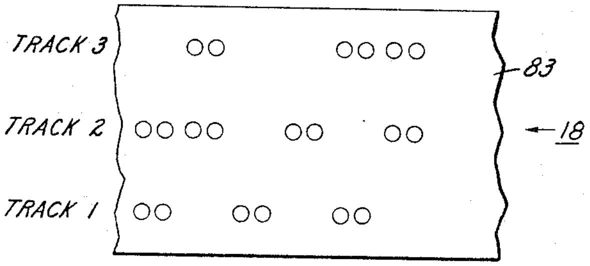
Figure 6C:
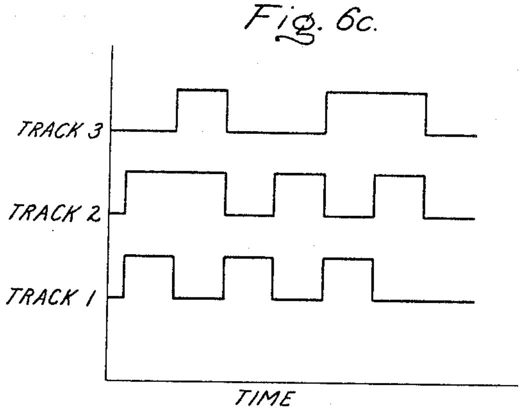

Other objects, features and many of the attendant advantages of this invention, will become better understood by reference to the accompanying drawings, wherein like parts in each of the several figures are identified by the same reference numeral, and wherein:

FIGURE 1 is a schematic diagram of a suitable scanning mirror electron microscope arrangement, and illustrates a suitable form of apparatus employed in carrying out the present invention;

FIGURES 1*a* and 1*b* are partial schematic views illustrating different forms of read-out electron beams that may be employed in operating the apparatus shown in FIGURE 1;

FIGURES 2*a*, 2*b*, and 2*c* are a series of pictures illustrating the effects that can be achieved with the apparatus arrangement shown in FIGURE 1;

FIGURE 3 is a sectional view of a new and improved write-read apparatus constructed in accordance with the present invention; and illustrates the same in conjunction with supporting electrical circuitry shown in functional block diagram form, and which is required in the operation of the apparatus in accordance with the principles of the invention;

FIGURE 4*a* is a cross sectional view of a thermoplastic film recording member illustrating the nature of the permanent deformations formed therein;

FIGURE 4*b* is a plan view of the fragment of thermoplastic film recording member shown in FIGURE 4*a*;

FIGURE 4*c* is a series of voltage amplitude versus time output signals obtainable with a data record such as that shown in FIGURE 4*b* when read out with the apparatus of FIGURE 3;

FIGURE 5*a* is a cross sectional view of a fragmentary portion of a different thermoplastic film recording member having imperfections in the conducting substrate comprising a part of the member;

FIGURE 5*b* is a greatly magnified plan view of the conducting substrate of the thermoplastic film data record member shown in FIGURE 5*a*;

FIGURE 6*a* is a fragmentary cross sectional view of still a third thermoplastic film data record member showing the same having an electric charge pattern formed thereon which has not been fixed permanently by the application of heat to the data record member to form physical deformations in the surface of the member;

FIGURE 6*b* is a plan view of the fragmentary part of thermoplastic film recording member shown in FIGURE 6*a*;

FIGURE 6*c* is a series of voltage amplitude versus time output characteristic curves representative of the signals that would be obtainable with the apparatus shown in FIGURE 3 when used to read out the data record member illustrated in FIGURES 6*a* and 6*b*;

FIGURE 7 is a partial sectional view of an alternative arrangement for the apparatus shown in FIGURE 3 wherein the reflected or turned around electron image may be read out directly; and FIGURE 8 is a schematic drawing of still a third form of apparatus suitable for practicing the invention.

The write-read scanning mirror electron microscope apparatus illustrated in FIGURE 1 of the drawings, is comprised by an electron gun 11 for projecting a beam of electrons indicated at 12. The electron gun 11 is comprised by an electron source 13 which may be a heated tungsten filament connected in proper alignment with a control grid electrode 14 and an accelerating anode 15. The electron source 13 produces electrons which are controlled in magnitude by the control electrode 14, accelerated by the accelerating anode 15, and projected along the path indicated at 12. The electron beam produced by electron gun 11 may be collimated somewhat by a collimating aperture structure indicated at 16. The lens assembly 17 may comprise a conventional magnetic lens for focussing the beam of electrons on a target specimen indicated at 18, and may be made adjustable so as to provide for scanning of the beam of electrons across the surface of the target specimen. Prior to reaching the target specimen 18, however, the electron beam is projected through a second lens assembly indicated at 19 which comprises in effect an objective lens assembly. This objective lens 19 in conjunction with the focussing lens 17 functions to focus the electron beam 12 on the target specimen 18 in a conventional manner. In the particular arrangement being described, the target specimen 18 comprised a very fine copper wire mesh which was electrically connected to a source of biasing potential indicated at 21 through a variable potentiometer 22.

The potentiometer 22 is adjustable in order to provide a reversing potential having a negative polarity of a desired magnitude to the target specimen 18. This reversing potential in conjunction with the energy of the electrons in the electron beam 12 causes a mirror reflection action to occur whereby the electrons in the electron beam are reflected or turned around at a point located on a turn around plane shown at 28 in FIGURES 1*a* and 1*b*. This turn-around plane is located just prior to reaching the surface of the target specimen 18. Very small potential differences existing on the surface of the target specimen 18 will cause potential variations which will extend beyond the turn-around plane so as to cause beam deflection of the electron beam at the turn-around points which correspond to the location of these small potential differences, and therefore produce image contrast. The electrons which are reflected or turned around at the turn-around plane are focussed by the objective lens assembly 19 upon a substantial image plane at which point a fluorescent screen indicated at 23 is located. It should be noted, therefore, that the lens assembly 19 while serving as an objective lens on the primary readout electron beam, is also positioned and adjusted to serve as a first focussing lens assembly for the reflected or turned around electrons, and serves to focus these electrons onto an image plane at which the fluorescent screen 23 is located. To provide for proper adjustment of the apparatus, a second fluorescent screen shown at 24 is located beyond the target specimen 18, and may be viewed through an appropriate optical viewing assembly indicated by the lens 25. Additionally, if desired, a suitable recording means such as a Land Polaroid camera indicated at 26 may be positioned to take pictures of the fluorescent screen 23. Alternatively, as will be described hereinafter in connection with FIGURE 3, a photomultiplier may be employed to view the fluorescent screen 23 for converting the varying intensity light flashes appearing thereon into a usable output electric signal.

In operation, as stated above, the energy of the electrons in the electron beam 12 will be determined primarily by the value of the accelerating potential applied to the accelerating anode 15 of the electron gun 11. This accelerating potential is adjusted to a value so that in conjunction with the reversing potential supplied to the target specimen 18 by the potentiometer 22 a turning around or reflection of the electrons occurs prior to their impinging upon the target specimen 18. In order to determine these values empirically, a fluorescent screen 24 was placed beyond the target specimen 18, and a fine copper mesh screen was employed as the target specimen. By defocussing the electron beam 12 so it essentially floods the surface of the target specimen 18 with a defocussed or widespread beam 12 in the manner shown in FIGURE 1*a* of the drawings, it is possible to reproduce on the fluorescent screen 24 a picture such as that shown in FIGURE 2*a* of the drawings. This is due to the fact that as the electron beam passes through the wire mesh target specimen 18 it is modulated so as to produce a picture of the wire mesh on the fluorescent screen 24 which can be viewed through the lens assembly 25. Upon this occurrence, the reversing potential supplied to the target specimen 18 from potentiometer 22 is adjusted so as to produce a turn around or reflecting action on the electron beam just prior to the electron beam reaching the target specimen 18. This is illustrated in FIGURE 1*a* of the drawings wherein it can be seen that at the turn around plane 28, most of the electron paths in the electron beam are reflected as a result of the mirror action of the target specimen on the electron beam. The reflected electrons are then imaged by the lens assembly 19 along a new path indicated at 29 upon an image plane at which the fluorescent screen 23 is located. The picture appearing on fluorescent screen 23 will be similar to that appearing on the screen 24 as shown in FIGURE 2*a* of the drawings. This picture if desired, can be permanently recorded by the camera 26 and in fact, the illustration shown in FIGURE 2*a* is a reproduction of the picture taken with just such an arrangement. It should be noted that the picture shown in FIGURE 2*a* illustrates the physical characteristics of the wire mesh screen target specimen 18, and constitutes a magnified image of the target specimen. In fact, with the apparatus arrangement shown, magnification of up to 125 times can be obtained. The bright spots shown at the intersection of the wire screen 39 are slight variations in the surface of the mesh due to some kinds of irregularity such as dust accumulated at these points, etc. which are charged up and cause the sparkling indicated.

The operation described above of the apparatus shown in FIGURE 1 constitutes no more than known techniques used in conjunction with conventional mirror electron microscopes. Such techniques are known and described in the literature. In the present invention, however, the electron beam 12 is focussed to a fine point or probe at the turn around point just ahead of the target specimen 18 in the manner shown in FIGURE 1*b* of the drawings. As illustrated in FIGURE 1*b*, the electron beam 12 in actuality is constituted by a number of electron paths which are focussed by the focussing lens 17 and the objective lens assembly 19 acting together to a small crossover shown at 45 just ahead of the turn around plane 28 at which the electrons are turned around. This small crossover probe or point of electrons is then caused to scan over the surface of the target specimen 18 by movement of the focussing lens 17, for example, or by an appropriate scanning lens (not shown) so as to cause the finely focussed electron beam to scan along the surface of the target specimen 18 to search the same for potential variations. The manner in which this is accomplished is illustrated in FIGURE 2*b* of the drawings wherein a reproduction of the finely focussed beam is shown at 36. The reproduction of the finely focussed beam 36 is illustrated against the background of an electron image of the fine wire mesh target specimen 18, which background image could be obtained in a variety of ways such as by a double exposure with the camera 26. It is illustrated in FIGURE 2*b* for the purpose of demonstrating the size of the probe however, with respect to the wire mesh. In viewing FIGURE 2*b*, it should be remembered, that this figure constitutes a reproduction of the electron image produced at the image plane where the fluorescent screen 23 is located. By appropriate adjustment of the first focussing lens assembly 17, the finely focussed electron beam probe 12 can be caused to move across the surface of the target specimen 18. This is illustrated in FIGURE 2*b* wherein it is shown that at 37, a second reproduction (by means of a triple exposure) of the finely focussed beam will occur after appropriate adjustment of the focussing lens 17 to cause the finely focussed beam of electrons to be scanned across the surface of the target specimen. It therefore can be appreciated that the scanning beam can be caused to move across the surface of the target specimen 18, and in doing so, can be caused to reproduce any potential variations occurring in that surface as is demonstrated in FIGURE 2*c* of the drawings. In FIGURE 2*c*, the well shaped dot at 38 represents a reproduction of the scanning beam of electrons at the image plane 23 where there are no imperfections or variations in the potential of the surface of the target specimen 18 which would be imposed on the turn-around plane 28 at a point where the beam 38 was turned around. If it is assumed, however, that the scanning beam of electrons is caused to move over the surface of the target specimen 18 to one of the sparkling points 39 shown in FIGURE 2*a*, then the reproduction of the finely focussed electron beam at the image plane 23 will be distorted as shown at 41 in FIGURE 2*c*. This distortion is due to the effect of the potential variation at the turn-around point on the turn-around plane of the reflected electron beam. It can be appreciated therefore, that very small potential differences or variations extending immediately beyond the equi-potential plane of the surface of the target specimen 18 can cause beam deflection at the turn-around point, and therefore produce image contrast. The manner in which this characteristic can be used to advantage in a practical data recording device will be described more fully in connection with FIGURE 3 of the drawings.

The new and improved write-read scanning mirror electron microscope shown in FIGURE 3 is comprised by an outer housing indicated by a dash-dot line 50 which is electrically insulated from an inner housing 51 maintained at a high electric potential, and hence requires the outer housing 50 for personnel safety. The various working parts of the scanning mirror microscope are supported within the inner housing 51 which is adapted to be evacuated by a suitable vacuum pump arrangement connected to the housing 51 through an outlet 52. The housing 51 is divided into a head portion 51*a* and two leg portions 51*b* and 51*c*. Supported in one leg portion 51*b* is an electron gun 11 which is comprised by a tungsten filament source of electrons 13 connected through a suitable insulated conductor to a filament supply source 53 formed by a battery and variable resistor. The filament supply source 53 is in turn connected to a read-write selector switch 54 having one fixed contact connected to a source of high positive cathode bias voltage 55, and the remaining fixed contact connected to ground. The electron gun 11 is further comprised by a control grid electrode 14 that is connected through an electrically insulated outlet and coupling capacitor to the movable contact of a read-write selector switch 56. The movable contact of the read-write selector switch 56 can be selectively switched to either two fixed contacts which are connected respectively to a writing signal source 57 and to a reading bias voltage source 58. The two read-write selector switches 54 and 56 are ganged together through a mechanical interconnection indicated by the dotted line 82 so as to be operated in synchronism. By this arrangement, the selector switches 54 and 56 in conjunction with other selector switches to be described hereinafter, are operative to connect either the high voltage bias 55 and the writing signal source 57 to the control grid 14 of electron gun 11, or the ground connection to filament 13 and reading bias voltage source 58 to the control grid 14 depending upon whether the apparatus is to be operated in its writing mode, or its reading mode. The electron gun 11 is further comprised by an accelerating anode 15 which is connected through a suitable insulated outlet to the movable contact of a second selector switch 61. The second selector switch 61 has its fixed contacts connected respectively to a writing high voltage source 62, and a reading high voltage source 63 so that by operation of the selector switch 61, either a writing high voltage or a reading high voltage may be applied to the accelerating anode 15. By this means, the electron gun 11 can be adjusted to provide either high energy electrons for writing on the target specimen 18 mounted in the head portion 51*a* of the housing (to be described more fully hereinafter), or it may be adjusted to provide lower energy electrons for reading out the target specimen 18 by the mirror action previously described in connection with FIGURE 1 of the drawings. It should be noted that simultaneously with the closure of the movable contact of switch 61 to connect the writing high voltage source to the accelerated anode 15, the selective switch 56 is closed on the writing signal source 57 so as to connect this source to the control grid electrode 14; and the switch 54 is closed on bias source 55. Alternatively, upon the selector switch 61 being closed on the reading high voltage source 63, the selector switch 56 is simultaneously actuated to connect the reading bias voltage source 58 to the control grid electrode 14, and switch 54 closes on its grounded terminal so that all of these elements of the electron gun 11 are activated in synchronism.

The electron gun 11 serves to project a beam of electrons along the path 12 toward the target specimen 18. Positioned adjacent the projected path of electrons 12 is a first focussing means comprised by a magnetic lens assembly 65 that is supported within the housing leg portion 51*b* by means of a core member 66 which is welded to, and comprises an integral part of the inner cylindrical leg portion 51*b* of the housing. The magnetic lens assembly 65 is a conventional toroidal magnetic lens fabricated from a number of turns of wire 67 which is brought out from the housing portion 51*b*, and energized from a suitable focussing current source connected thereto through the terminal 68. In order to avoid having to outgas the space of lens assembly 65 in which the coils of wire are located during evacuation of the housing 51, a vacuum tight seal 69 which is not ferromagnetic is placed over the gap between the ends of the core member 66.

Located at a point further along the projected electron beam path 12 is a second magnetic focussing lens assembly 70 which is supported within the cylindrical leg portion of the housing 51*b* in a similar manner to the lens assembly 65, and is connected through a selector switch 71 to a focus current source 72. The focus current source 72 has both a writing focus current supply and a reading focus current supply which are selectively connected in circuit relationship with the focussing lens assembly 70 by the selector switch 71. The selector switch 71 preferably is ganged with switches 54, 56 and 61 as shown by the dotted line connection 82 to facilitate switching the apparatus from its writing mode of operation to the reading mode of operation. Since the second focussing lens assembly 70 in all other respects is similar to the lens assembly 65, a further description of the fabrication of the lens assembly 70 is believed unnecessary.

At a point further along the projected electron beam path 12 from the electron source 11 and the lens assembly 71, is a scanning lens arrangement comprised by a pair of plates 73 and 74 which are disposed adjacent the projected electron beam path 12. The plate 73 is physically supported by a mechanically rigid rod which also serves as an electrical connection to the plate, and is brought outside the housing 51 through a suitable insulating outlet for connection to one terminal of a source of scanning signals (not shown). Similarly, the plate 74 is supported on a mechanically rigid rod which likewise is brought out through an insulated outlet and connected to the remaining terminal of the source of scanning signals. A similar set of plates, one of which is shown at 80, acts on the electron beam to cause it to be scanned in a transverse direction to that caused by the plates 73, 74. By this arrangement, the plates 73 and 74, and the plates 80 coact on the electron beam 12 and cause it to be scanned in two transverse directions to thereby provide a two-dimensional scanning across the surface of the target specimen.

In order that the electron beam be bent so as to be directed toward the target specimen 18, a magnetic prism 75 is supported within the head portion 51*a* of the housing 51, and is positioned adjacent the projected electron beam path 12. The magnetic prism 75 comprises magnetic cylinder lens such as is described in the textbook entitled, "Electron Optics" by Klemperer, 2nd edition, Cambridge University Press, 1953. The magnetic prism 75 is supported within the head portion 51*a* of the housing by a suitable insulating ring 151 and O-ring 152 support secured within the cylindrical head portion 51*a* of the housing. The magnetic prism 75 is comprised by a circular core member having a pair of diametrically opposed spaced apart pole pieces surrounded by a plurality of turns of wire that are connected through a terminal 76 to a suitable current source (not shown) for energizing the magnetic prism 75. The function of the magnetic prism 75 is the same as that of an optical prism in that it serves to bend the electron path 12 of the beam of electrons being projected from electron gun 11 at this point in the housing 51 so as to direct the beam of electrons onto the target specimen 18. As will be described more fully hereinafter, the magnetic prism 75 also serves to bend the reflected or turned around electrons reflected from the target specimen 18 back along a reflected electron beam path 12*a* in the housing portion 51*c*. With respect to the primary beam of electrons supplied by electron gun 11, however, this primary beam of electrons is bent by the prism 75 and projected along the continuation of the path 12. In many constructions, it may be desirable to include a beam current measuring probe 77 connected to a current measuring instrument 78 to provide a means for measuring value of the beam current in the primary beam of electrons 12. This beam current measuring probe 77 is adjustable so that it can be inserted into the path of the electrons or retracted therefrom when not in use in deriving a measurement of the electron beam current. After passing the current measuring probe 77, the beam of electrons passes through a second focussing means 19 which in fact comprises an objective lens assembly, and which serves in conjunction with the first and second focussing lens assemblies 65 and 70 to focus the beam of electrons 12 onto the target specimen 18.

The second focussing means or objective lens assembly 19 comprises an annular conductive plate which is mechanically supported within the head portion 51*a* of the housing by a suitable rigid electrically conductive rod. This electrically conductive rod is connected through an insulating outlet to the movable contact 79 of a potentiometer 81. Potentiometer 81 is capable of providing either a negative polarity or a positive polarity high voltage to the objective lens assembly 19, and also may effectively ground the lens assembly when the contact on 79 is located at its mid tap position. Also, it should be noted that the movable contact on 79 is connected through a mechanical connection indicated by the dotted line 82 to the selector switch arms 54, 56, 61 and 71 so that all are actuated in synchronism. Thus, the mechanical interconnecting means 82 operates as a master write-read control switch to connect the objective lens assembly 19 to a source of high positive potential while the selector switches 54, 56 and 61 are connected in their writing position, and to connect the movable contact arm 79 to either ground or a negative polarity potential upon the selector switches 56 and 61 being switched to their reading position. In this manner, the objective lens assembly 19 can be caused to either accelerate or to retard the electrons projected along the electron beam path 12 just prior to reaching the target specimen 18.

The target specimen 18 preferably comprises a data record member that is formed by a thermoplastic recording medium 83 secured over a thin electrically conducting surface 84 which in turn is supported on an electrically insulating backing member 85. For a precise description of the composition of the thermoplastic recording medium 83, and the manner of its fabrication, the manner of fabrication of the electrically conducting surface 84, and the character of the insulating backing member 85, reference is made to copending U.S. application Serial No. 8,842, filed February 15, 1960 entitled "Method, Apparatus and Medium for Recording," William E. Glenn, inventor and assigned to the General Electric Company. See also, U.S. Patent No. 3,063,872 entitled "Recording Medium and Polysiloxane and Resin Mixture Therefor," Edith M. Boldebuck, inventor, issued November 13, 1962. For the purpose of the present discussion, it is sufficient to note that the thermoplastic recording medium 83 in fact constitutes an electrical insulator whose surface can be rendered substantially molten by the application of heat thereto. If the read-wire apparatus FIGURE 3 is adjusted to operate in its writing mode of operation as will be discussed more fully hereinafter, then electrons may be deposited on the surface of the thermoplastic recording medium 83 in predetermined patterns which can be so arranged as to record intelligence. For example, by switching the electron beam on and off with the writing signal source, electrons will be either deposited at a particular locale on the surface of the data record member 18, or there will be an absence of electrons. Presence or absence of electrons can be used to record information in binary form. Such prearranged electron charge patterns on the surface of the thermoplastic recording medium 83 are in fact illustrated in FIGURES 6*a* and 6*b* of the drawings as will be discussed more fully hereinafter.

If subsequent to the deposition of the electron charge patterns on the surface of the thermoplastic recording medium 83, heat is applied to the surface of the thermoplastic recording medium by any suitable heat applying means such as infrared heater, electrical conduction through the conductive surface 84, or by the application of a radio frequency induction heating signal in the manner described in U.S. Patent No. 3,008,066, such heating will render the surface of the thermoplastic recording medium 83 substantially molten. Upon the surface of the recording medium being rendered molten, the electric charges deposited thereon will act on the ground plane formed by the conductive surface 84 to physically deform the surface of the thermoplastic recording medium 83 in the manner shown in FIGURE 4*a* of the drawings. Thereafter, upon subsequent cooling of the surface of the thermoplastic recording medium, the physical deformations will be permanently set into the surface of the thermoplastic recording medium to thereby form a permanent record of the information recorded in the electric charge patterns. It should be noted that even after fixation by heating and subsequent cooling, there remains a latent electrostatic charge image on the surface of the thermoplastic recording medium due to the electrons deposited thereon as indicated by the minus signs in FIGURE 4*a*. In prior recorders, such as that described in the above-identified copending Glenn application, the physical deformations in the surface of the thermoplastic recording medium were optically read out by employing the refractive or diffractive character of the deformation to modulate a light beam with the intelligence recorded therein. However, such optical readout of the deformations in the surface of the thermoplastic recording medium 83 requires that the recording medium, the substrate conducting surface 84 and the backing member 85 all be optically transparent. Optical transparency of these members of the data record member is one requirement obviated by the present invention which in fact can be used to sense the latent electrostatic charge pattern on the surface of the thermoplastic recording medium 83 either after fixation by heating and subsequent cooling, or prior to such fixation. Hence, the present invention makes possible a method and apparatus for reading out information recorded in a latent electric charge pattern which does not require prior fixation of the electrostatic charge image in order to read out the information recorded.

In order to use the data record member comprised by thermoplastic recording medium 83, conductive substrate 84 and insulating backing member 85 in the present readout technique, however, it is necessary to connect the data record member as an anticathode. For this purpose, a part of the insulating backing member 85 is removed at an appropriate point such as 91 so as to provide electrical contact to the substrate conducting surface 84. This electrical contact is then connected to a suitable potentiometer 92 for applying a negative polarity potential to the conducting substrate 84. This negative polarity potential serves as a reversing potential in the manner of the potential 22 of the arrangement described in connection with FIGURE 1, to cause the electrons in the beam 12 to be reversed or reflected by mirror action prior to hitting the thermoplastic recording medium 83. Needless to say, it is of course necessary that this reversing potential be removed either by grounding, or possibly by the application of a positive polarity potential to the conducting surface 84 during the writing operation. For this purpose, if desired, the movable contact of the potentiometer 92 may be ganged with the contact arm 79 and selector switches 56 and 61 so as to be actuated in synchronism therewith. However, it is believed more desirable that this potentiometer be operated separately in switching from the writing to the reading operation in order to provide a finer adjustment over the action of the electron beam near the surface of the anticathode formed by the data record member 18.

To complete the head portion 51*a* the backing member 85 is supported in place within the head portion 51*a* of the housing on an enlarged flange portion by being seated on an O-ring seal 95 which serves to seal the interior of the housing in a vacuum tight manner. In addition to this seal, however, the head portion 51*a* may be closed by a suitable cylindrical cover 96 likewise supported on an O-ring seal 97 seated on inturned rim of the enlarged flange portion, and retained in place by set screws 98. Accordingly, it can be appreciated that the arrangement provides double security to assure the vacuum tight integrity of the interior of the housing 51. Additionally, by removing the cover plate 96, the data record member 18 may be readily replaced with a second data record member having different information recorded thereon by predetermined electric charge pattern arrangement so as to allow for interchangeability of the data record members 18 either being written on, or read out. Also, it should be noted that the head portion 51*a* of the housing is electrically insulated from the remainder of housing 51 by an insulating separator 99. This allows the head portion 51*a* in which the data record member 18 is disposed to be maintained at an electric potential different from that of the remainder of the housing 51.

When the write-read apparatus shown in FIGURE 3 is adjusted to operate in its writing mode, the electron beam 12 impinges upon, and electrons adhere to the surface of the thermoplastic recording medium 83. To provide adequate assurance that this will indeed happen, the potentiometer 92 can be constructed in such a manner as to enable the application of a slightly positive potential to the conducting surface 84, however, in most instances, such positive polarity potential will not be required and it would be adequate that the surface be grounded. Upon the write-read apparatus being adjusted to operate in its reading mode of operation, however, a negative polarity potential must be applied to the conducting surface 84 so that the data record member 18 as a structure will operate as an anticathode. Upon being thus conditioned, the electrons in the electron beam will be turned around or reflected by a mirror action that occurs at a turn around point in a turn around plane disposed from the surface of the thermoplastic recording medium 83 in the manner described in relation to the apparatus shown in FIGURE 1. This reflection or turn around of the electrons in electron beams hereinafter referred to as mirror action, can be accomplished by proper adjustment of the reversing potential applied to the conductive surface 84 from the potentiometer 92. Upon thus being turned around, or reflected by the mirror action of the data record member 18, the electrons of electron beam 12 will be refocussed by the objective lens assembly 19 which projects them back through the magnetic prism 75. Because the direction of the reflected electrons through the magnetic prism 75 is now the reverse of the primary beam, the prism will act to bend the electrons onto a new path 12*a*. To assure that the objective lens assembly 19 will operate as a focussing lens assembly in the reading mode of operation, it is necessary that it be grounded, or perhaps a slight potential be applied different from the potential applied thereto in the writing operation. The electrons thus reflected or turned around by the mirror action of the data record member 18 will be projected along the path 12*a* through a suitable collimating lens arrangement. The collimating lens arrangement is comprised by a pair of annularly-shaped conductive members 101 and 102 positioned on opposite sides of a second objective lens assembly 103. The annular members 101 and 102 are disposed at right angles to the electron beam path 12*a* and have their outer peripheries secured directly to the inner circumference of the leg portion 51*c* of the housing. The second objective lens assembly 103 which also serves as a third focussing means is an annularly-shaped electrically conducting member which is rigidly supported in position mechanically by a suitable conducting rod that is brought out of the housing through an insulating support, and connected to an appropriate bias potential source shown at 104. By this arrangement, a potential may be applied to the second objective lens assembly 103 so that this assembly in conjunction with the first objective lens assembly 19 serves to selectively focus the reflected or turned around electrons on a substantial image plane at the end of the housing leg portion 51*c* where a fluorescent screen 105 is located. Those electrons which are turned around at points where potential irregularities occur, will be rejected by the lens assembly 12, and results in a visible varying intensity light image being produced on the fluorescent screen 105. This light image will be a substantial reproduction of the varying electron image produced at the image plane which in turn is a reproduction of the very small potential differences extending immediately beyond equipotential lines around the surface of the data record medium 18. These very small potential differences will cause deflection of the electron beam at the turn around points in the turn around around plane during the reading mode of operation in much the same manner as was explained in connection with the apparatus arrangement shown in FIGURE 1 of the drawings.

As a result of the above described arrangement, during the reading operation the primary electron beam 12 is caused to scan across the surface of the data record member 18 in accordance with a predetermined scanning pattern determined by the scanning signal applied to the deflection plates 73, 74 and 80, such scanning pattern being similar to the raster of a television signal for example. The very small potential differences due to the latent electrostatic charge pattern on the surface of the data record member 18 will extend immediately beyond the equipotential lines of the surface of the data record member, and will cause the turned around or reflected electrons to be deflected out of the field of lens assembly 19 at the turn around points near the vicinity of these charges so as to produce image contrast. This image contrast will then appear as varying intensity light flash on the fluorescent screen 105. It should be noted at this point that because the scanning of the surface of the data record member 18 is a time sequential operation, the varying intensity light flashes appearing on the fluorescent screen 105 likewise will be varying in a time sequential manner. These time sequential varying intensity light flashes are then observed by suitable photoelectric device such as a photomultiplier tube 106 secured in the housing leg portion 51*c*, and positioned to view the fluorescent screen 105. The photomultiplier 106 preferably is mounted in housing portion by means of electrically insulating vacuum tight supports, and operates to produce a time varying electric output signal whose output amplitude varies in time in accordance with the time varying intensity light flashes.

The above described action can be better appreciated in connection with FIGURES 4, 5, and 6 of the drawings.

It is assumed that the write-read apparatus shown in FIGURE 3 is adjusted to operate in its reading mode by appropriate actuation of the master control switch means 82, and the application of the reversing potential to the data record member 18. Further, if the data record member 18 is one which has been subjected to fixation through heating and subsequent cooling of the electron charge patterns written thereon, it will appear as shown in FIGURES 4*a* and 4*b* wherein 4*b* represents a plan view of the grooves formed in the surface of the thermoplastic recording medium 83 by the fixation process. It is noted that these grooves have slight irregularities as at 111 due to modulation of an intelligence signal. When the information is thus recorded, if the scanning means 71 is actuated with a suitable scanning control signal, so as to cause the electron beam to in effect scan up and down the surface of the thermoplastic recording medium along a path whose centers are spaced apart the approximate distance of the grooves 1, 2 and 3 shown in FIGURE 4*b*, then the irregularities in the path will cause the turned around or reflected electron beam to be deflected at these points. As a consequence, as the scanning beam of electrons is caused to move along the surface down the path represented by groove 1 at the points 111 in groove 1, because of the deflection of the electrons at this point, no electrons will be reflected or returned by the objective lens assembly 19 at this point in time of the sequential scanning operation. Hence, a variation in the intensity of the light spot appearing on the fluorescent screen 105 will occur. This variation in intensity will be viewed by the photomultiplier 106 which operates to convert this varying intensity light flash into a time variant output electric signal such as that shown in FIGURE 4*c* of groove 1. Similarly, upon scanning of the grooves 2 and 3, the varying intensity light flashes will be produced in time sequence in synchronism with the scanning of the data record member surface at the corresponding points 111, and will in turn produce amplitude variations in the output electric signal developed by the photomultiplier 106 as shown at 2 and 3 in FIGURE 4*c*. It should be noted, however, that the deflection of the reflected or turned around electrons at the points 111 is not caused by the physical deformation in the surface of the thermoplastic recording medium, but instead is caused by the accumulation of electric charges at this point required in order to form the irregularity in the groove there shown.

FIGURES 6*a* and 6*b* illustrate a data record member 18 in which the electrical charges arranged on the surface of the data record member in a predetermined intelligence conveying pattern have not been fixed by the heating and cooling operation described earlier. In FIGURE 6*a*, these prearranged electrical charges are illustrated as comprising accumulations of charges of electrons represented by the small circles having negative or minus signs on the inside thereof. It can be appreciated from FIGURE 6*a* therefore, that by the predetermined arrangement of areas where charges are deposited and where there are no charges, information can be recorded in binary form as represented by the arrangement of one's and zero shown in the brackets over these areas. FIGURE 6*b* is a plan view of the data record member illustrated in FIGURE 6*a*. It should be noted, that the manner in which the electron charges are formed in the prearranged pattern on the surface of the data record member 18 is immaterial. These charges may have been placed there by a writing operation such as that described in connection with the present read-write electron apparatus. Alternatively, the charges could have been placed there by any other means for selectively charging the surface of an insulating member such as by use of a photoconductor. It is important to note, however, that the charge patterns have not been fixed by heating and subsequent cooling of the insulating surface, but are merely a latent electrostatic charge image.

Upon a data record member 18 such as shown in FIGURES 6*a* and 6*b* being read out by the write-read apparatus shown in FIGURE 3 of the drawings, the accumulation of electron charges at selected points along the surface of the data record member will cause the reflected or turned around electrons to be deflected at these points because of the potential variations produced there by the accumulation of charges. As a consequence, the electron image focussed on the fluorescent screen 105 will produce varying intensity light flashes on the screen whose variations are due to the presence of the positive charges on the surface of the data record member being scanned out. Accordingly, upon the scanning or reading electron beam being scanned along the surface of the data record member represented by track 1, and output signal such as that shown as track 1 in FIGURE 6*c* will be produced at the output of the photomultiplier. Similar output signals are obtained from track 2 and track 3 as shown in FIGURE 6*c* wherein the increased amplitude pulses are produced during scanning of the surface of the data record member 18 where the electron charges are deposited and hence, represent the occurrence of deposited charge patterns at these points on the surface. Accordingly, it can be appreciated that the output electric signal is a time varying output electric signal representative of the intelligence recorded on the surface of the data record member in the form of a latent electrostatic charge image. This output electric signal may then be used in any desired manner as representing the information retrieved from the data record member.

It should be noted that while the write-read apparatus shown in FIGURE 3 employs a fluorescent screen 105 and photomultiplier 106 to convert the varying intensity electron image into an electric output signal, the arrangement could very well be modified to provide for direct conversion of the varying intensity electron image into a time variant output electric signal. Such modification could be made in the manner shown in FIGURE 7 of the drawings wherein it is seen that an electron multiplier device 121 is mounted in the end of the leg portion 51*c* of the housing in place of the fluorescent screen 105. With such an arrangement, it would be necessary to adjust the second objective lens assembly 103 so as to substantially focus the reflected electrons onto the electron multiplier 121. With the apparatus thus modified, the electron multiplier 121 will then serve to directly convert the varying intensity electron image into a time varying sequential output electric signal representative of the intelligence being scanned out by the primary readout electron beam. The modified arrangement of FIGURE 7 has the disadvantage, however, in that it is not possible to visibly check the operation of the write-read apparatus whereas with the arrangement shown in FIGURE 3, such visible monitoring of the operation of the apparatus is made possible simply by viewing the fluorescent screen 105 from the reverse side of the screen. The use of a fluorescent screen 105 in the arrangement of FIGURE 3 is also preferred for another reason as described hereinafter in the following paragraph.

In the fabrication of data record members comprised by a thermoplastic recording member 83, a conducting substrate 84 and insulating backing member 85 such as shown in FIGURE 5*a*, it often occurs that the conducting substrate 84 will have discontinuities or cracks such as shown at 131 occurring therein. These discontinuities will adversely affect the electrostatic charge image recorded on the surface of the insulating medium 83 whether thermoplastic or not due to the irregularities caused by such cracks in the potential plane surrounding the surface of the conducting substrate 84. Additionally, such discontinuities will adversely affect radio frequency heating of the thermoplastic film by coupling to the conductive substrate. If the overlying insulating recording medium 83 is optically transparent, then the discontinuities or cracks 131 would appear as shown in FIGURE 5*b*. It has also been determined that if such a data record member is connected into the write-read apparatus in FIGURE 3, and a reversing potential supplied thereto from the potentiometer 92 so that it operates as an anticathode, it is possible to produce an image of the conductive substrate 84 on the fluorescent screen 105. This is accomplished by adjusting the primary readout beam 12 by defocussing the same in the manner discussed with relation to FIGURE 1*a* of the drawings so as to reproduce an image of the underlying conductive substrate 84 on the fluorescent screen 105 by conventional mirror electron microscope action. The reproduction of the image of the underlying conductive substrate 84 appearing on the fluorescent screen 105 will be substantially identical to the view shown in FIGURE 5*b* since the discontinuities 131 and the conducting substrate produce potential variations that cause deflection of the turned around or reflected electrons at the turn around plane of such electrons. It should also be noted that the turn around plane of the reflected or turned around electrons will be located at a point removed from the surface of the overlying insulating thermoplastic medium 83 so that the electrons never strike the surface of the medium. Accordingly, by so adjusting the primary readout beam as to provide this conventional electron mirror microscope inspection of the underlying conductive substrate 84 prior to recording thereon, the usability of a particular data record member 18 can be readily checked prior to subjecting the same to a writing or recording operation as described above.

FIGURE 8 of the drawings illustrates schematically an alternative physical arrangement for the write-read apparatus shown in FIGURE 3 of the drawings. In FIGURE 8, the apparatus has been illustrated only schematically since the additional structure required to make an operable write-read apparatus would be identical to that illustrated in FIGURE 3, and hence need not be described again. In the arrangement of FIGURE 8, an electron beam 12 produced by an electron source (not shown) passes through a focussing coil assembly 70, and scanning plate arrangement 73, 74 and 80 into a magnetic prism 141. The magnetic prism 141 is different from the corresponding magnetic prism 75 of the arrangement shown in FIGURE 3 in that it causes the electron beam 12 to be bent through an angle of 90°, and to be directed towards a data record member 18. Prior to reaching the data record member 18, however, the electron beam 12 passes through an objective lens assembly 19. The magnetic prism 141 differs structurally from the magnetic prism 75 in that the core member thereof must be horseshoe-shaped so as to allow the electron beam to travel along the path indicated by the dotted line through an opening between the opposed ends thereof. At the surface of the data record member 18, the electron beam 12 is caused to be turned around or reflected by the mirror action of the data record member (which serves as an anticathode). The turned around or reflected electrons are focussed by the lens assembly 19 which images the reflected electron beam, indicated at 12*a*, on the magnetic prism 141. The magnetic prism 141 then causes the returned or reflected electron beam to be bent through another 90° angle, and to travel along the path 12*a* in an essentially straight line extension of the primary beam 12. This reversal in direction of the reflected electron beam 12*a* is due to the fact that the electrons are passing through the magnetic prism 141 in a reverse direction. The returned or reflected electron beam 12*a*, is then focused by the objective lens assembly 103 and the collimating lens structures 101 and 102 onto the fluorescent screen 105. It should be noted, that in operation, the arrangement of FIGURE 8 is similar to that of FIGURE 3, the only difference being that the physical layout of FIGURE 8 allows all of the elements of the write-read apparatus to be arrayed in an "in-line" arrangement. Such an in-line arrangement can simplify fabrication of the write-read apparatus, as well as to greatly facilitate alignment of the various components thereof when placing the apparatus in operation initially. In all other respects, the arrangement of FIGURE 8 operates in the same manner as that described in FIGURE 3, and produces the same advantageous results.

From the foregoing description, it can be appreciated that the present invention provides a new and improved write-read electron apparatus and method making it possible to read out latent electrostatic charge patterns nondestructively with an electron beam that is not allowed to strike the data record but which employs a reflected or turned around electron image to reproduce the data recorded on the member. With such apparatus, it is quite easy to convert from a reading mode to a writing mode of operation by simple voltage changes to existing and identical scanning and focussing components. Such changes may be readily made without requiring serious realignment problems in converting from the writing to the reading mode. Additionally, the new and improved technique of readout obviates the need for employment of optically transparent material in fabrication of the data record members. Further, the invention obviates the need for fixation by heating and subsequent cooling of the data record member prior to the record member being read out. An additional advantage provided by the invention, is that a magnified image of the data record surface is obtained thereby providing a substantial improvement in the resolving power of the instrument. Finally, the new and improved apparatus makes possible a precheck of the suitability of any particular data record member for use in recording data prior to employing the same in a writing or recording process.

Accordingly, it can be appreciated that while applicant has disclosed several embodiments of the invention, alternative arrangements and techniques embodying the invention will be suggested to those skilled in the art, in the light of the above teachings. It is to be expressly understood therefore that the invention is in no way limited to the specific embodiments disclosed, but is defined by the appended claims.

What I claim as new and desire to secure by Letters Patent of the United States is:

1. The method of reading out information stored on a surface in the form of a latent electrostatic image by means of an electron mirror microscope which method comprises connecting the surface having the latent electrostatic image stored thereon as the anticathode of the electron-mirror microscope, scanning the surface with a finely focussed electron beam in time sequence in accordance with a predetermined pattern, the finely focussed electron beam being accelerated to a voltage value such that mirror action occurs prior to the electrons of the beam striking the anticathode surface, the reflected electrons being representative of the potential variations at the turn around points of the time sequential scanning electron beam, focussing the reflected electrons, and deriving a time varying output electric signal from the reflected electrons representative of the variations in the latent electrostatic image.

2. The method set forth in claim 1 in wherein the reflected electrons are focussed to a substantial image plane, the variations occurring in the image plane are converted to varying intensity light flashes, and the varying intensity light flashes are converted into a time varying output electric signal representative of the variations in the latent electrostatic image.

3. The method set forth in claim 1 wherein said reflected electrons are directly converted into a time varying output electric signal representative of the variations in the latent electrostatic image.

4. The nondestructive method of inspecting a substrate conducting surface for discrete discontinuities, the conducting surface having an overlying insulating surface with an electron mirror microscope, the method comprising connecting the substrate conducting surface to be examined as the anticathode of the electron mirror microscope, flooding the surface with a defocussed wide electron beam, the wide electron beam being adjusted to a value such that mirror action occurs prior to the electrons striking the anticathode surface, focussing the reflected electrons on a subtsantial image plane, the potential variations of the image being representative of the discontinuities occurring in the substrate conducting surface, and converting the focussed reflected electrons in the image plane into a visible image of the substrate conducting surface.

5. The method set forth in claim 4 wherein the conducting anticathode surface is grounded.

6. A scanning mirror electron apparatus including in combination an electron gun for projecting a beam of electrons, having a predetermined energy level, first focussing means adjacent the projected path of the beam of electrons for focussing the beam of electrons in a desired manner, second focussing means adjacent the projected path of the beam of electrons at a point further from the electron gun than the first focussing means, a target specimen positioned in the projected path of the beam of electrons substantially at right angles thereto at a point further from the electron gun than the second focussing means, the first and second focussing means coacting to focus the electron beam to a fine point on a turn around plane slightly disposed from the target specimen towards the electron gun, means for applying a reversing potential to the target specimen whereby mirror action on the beam of electrons will take place, to cause the beam of electrons to be turned around at a turn around point on the reflected plane prior to striking the specimen, the second focusing means being located and adjusted to focus the reflected electron image on a substantial reflected image plane, converting means located generally at the reflected image plane of the second focusing means for converting variations in the turned around electron image into a detectable indication of variations in the specimen, and means for evacuating the space through which the electrons travel between the electron gun, the specimen and the converting means.

7. The combination set forth in claim 6 wherein the electron gun is adjustable to provide high energy, electrons for impressing electrons on the specimen in a writing operation without obtaining the mirror action, and to provide lower energy electrons for reading out the specimen by mirror action in a reading operation.

8. The combination set forth in claim 6 wherein the electron gun is adjustable to provide high energy electrons for writing on the specimen without obtaining mirror action, and the electron gun is further characterized by a control grid, and means for operatively coupling a writing signal source to the control grid during the writing mode of operation.

9. The combination set forth in claim 6 wherein the apparatus is further characterized by an electron gun having an adjustable accelerating anode that can be adjusted to provide high energy electrons and lower energy electrons, a variable source of potential operatively coupled to the specimen for selectively applying an accelerating potential and a reversing potential to the specimen, and write-read control switch means operatively coupled to the adjustable accelerating anode and the viarable source of potential for selectively deriving high energy electrons and applying an accelerating potential to the specimen simultaneously for impressing the electrons on the specimen in a writing operation without obtaining the mirror action, and for simultaneously selectively deriving lower energy electrons and applying a reversing potential to the specimen simultaneously in a reading operation for reading out the specimen by mirror action.

10. The combination set forth in claim 6 wherein the combination is further characterized by an electron gun, an electron source, a control grid, and an accelerating anode electrode, a writing signal source and a control grid reading bias signal source, selective switching means for selectively connecting said control grid to said writing signal source and to said control grid reading bias signal source, a writing high voltage supply and a reading high voltage supply, selective switching means for selectively connecting said accelerating anode to the writing high voltage supply and to the reading high voltage supply, a variable source of potential operatively coupled to the target specimen for selectively applying an accelerating potential and a reversing potential to the specimen, and write-read control switch means interconnecting both said selective switching means and said variable source of potential for selectively and simultaneously supplying said writing signal to the control grid, said writing high voltage to the accelerating anode, and an accelerating potential to the specimen during the writing operation, and for selectively and simultaneously supplying said control grid reading bias signal to the control grid, said reading high voltage to the accelerating anode, and a reversing potential to the specimen during the reading operation of the apparatus.

11. The combination set forth in claim 6 further characterized by scanning means positioned adjacent the projected electron path intermediate the electron gun and the specimen for scanning the finely focussed electron beam over the surface of the specimen, and means for operatively coupling a scanning signal source to said scanning means for controlling the action thereof.

12. The combination set forth in claim 6 wherein the combination is further characterized by an electron gun, an electron source, a control grid, and an accelerating anode electrode, a writing signal source and a control grid reading bias signal source, selective switching means for selectively connecting said control grid to said writing signal source and to said control grid reading bias signal source, a writing high voltage supply and a reading high voltage supply, selective switching means for selectively connecting said accelerating anode to the writing high voltage supply and to the reading high voltage supply, a variable source of potential operatively coupled to the target specimen for selectively applying an accelerating potential and a reversing potential to the specimen, and write-read control switch means interconnecting both said selective switching means and said variable source of potential for selectively and simultaneously supplying said writing signal to the control grid, said writing high voltage to the accelerating anode, and an accelerating potential to the specimen during the writing operation, and for selectively and simultaneously supplying said control grid reading bias signal to the control grid, said reading high voltage to the accelerating anode, and a reversing potential to the specimen during the reading operation of the apparatus, scanning means positioned adjacent the projected electron path intermediate the electron gun and the specimen for scanning, the finely focussed electron beam over the surface of the specimen. and a scanning signal source operatively coupled to said scanning means for controlling the action thereof.

13. The combination set forth in claim 6 wherein the specimen comprises a data record member having electrical charges recorded thereon in intelligence conveying patterns.

14. The combination set forth in claim 6 wherein the specimen comprises a data record member having electrical charges recorded thereon in intelligence conveying patterns, and wherein the combination is further characterized by means for replacing the data record member with a replacement data record member having different intelligence conveying patterns of electrical charges recorded thereon.

15. The combination set forth in claim 6 wherein the apparatus is further characterized by an electron gun having an adjustable accelerating anode that can be adjusted to provide high energy electrons and lower energy electrons, a variable source of potential operatively coupled to the specimen for selectively applying an accelerating potential and a reversing potential to the specimen, and write-read control switch means operatively coupled to the adjustable accelerating anode and the variable source of potential for selectively deriving high energy electrons and applying an accelerating potential to the specimen simultaneously for impressing the electrons on the specimen in a writing operation without obtaining the mirror action, and for simultaneously selectively deriving lower energy electrons and applying a reversing potential to the specimen simultaneously in a reading operation for reading out the specimen by mirror action, and wherein the specimen comprises a data record member having electrical charges recorded thereon in intelligence conveying patterns, scanning means positioned adjacent the projected electron path intermediate the electron gun and the data record for scanning the finely focussed electron beam over the surface of the data record, and means for operatively coupling a scanning signal source to said scanning means for controlling the action thereof.

16. The combination set forth in claim 6 wherein the combination is further characterized by an electron gun, an electron source, a control grid, and an accelerating anode electrode, a writing signal source and a control grid reading bias signal source, selective switching means for selectively connecting said control grid to said writing signal source and to said control grid reading bias signal source, a writing high voltage supply and a reading high voltage supply, selective switching means for seletively connecting said accelerating anode to the writing high voltage supply and t o the reading high voltage supply, a variable source of potential operatively coupled to the target specimen for selectively applying an accelerating potential and a reversing potential to the specimen, and write-read control switch means interconnecting both said selective switching means and said variable source of potential for selectively and simultaneously supplying said writing signal to the control grid, said writing high voltage to the accelerating anode, and an accelerating potential to the specimen during the writing operation, and for selectively and simultaneously supplying said control grid reading bias signal to the control grid, said reading high voltage to the accelerating anode, and a reversing potential to the specimen during the reading operation of the apparatus, and wherein the largest specimen comprises a data record member formed by a thermoplastic film recording medium supported over an electrically conducting surface that is in turn supported by a suitable electrically insulating backing member with the thermoplastic film recording medium having electrical charges recorded thereon in intelligence conveying patterns, scanning means positioned adjacent the projected electron path intermediate the electron gun and the data record for scanning the finely focussed electron beam over the surface of the data record member, means for operatively coupling a scanning signal source to said scanning means for controlling the action thereof, and means for removing and replacing the data record member with a replacement data record member having different intelligence conveying patterns of electrical charges recorded thereon.

17. The combination set forth in claim 6 further chartcterized by a fluorescent screen positioned substantially at the image plane of the turned around electrons for converting the variations in the turned around electrons into time varying intensity light flashes, and photoelectric means positioned to view the fluorescent screen for converting the time varying light flashes into a time varying electric output signal representative of the variations in the specimen.

18. The combination set forth in claim 6 further characterized by an electron multiplier positioned substantially at the image plane of the turned around electrons for directly converting the variations in the turned around electrons into a time varying electric output signal representative of the variations in the specimen.

19. The combination set forth in claim 6 wherein the combination is further characterized by an electron gun, an electron source, a control grid, and an accelerating anode electrode, a writing signal source and a control grid reading bias signal source, selective switching means for selectively connecting said control grid to said writing signal source and to said control grid reading bias signal source, a writing high voltage supply and a reading high voltage supply, selective switching means for selectively connecting said accelerating anode to the writing high voltage supply and to the reading high voltage supply, a variable source of potential operatively coupled to the target specimen for selectively applying an accelerating potential and a reversing potential to the specimen, and write-read control switch means interconnecting both said selective switching means and said variable source of potential for selectively and simultaneously supplying said writing signal to the control grid, said writing high voltage to the accelerating anode, and an accelerating potential to the specimen during the writing operation, and for selectively and simultaneously supplying said control grid reading bias signal to the control grid, said reading high voltage to the accelerating anode, and a reversing potential to the specimen during the reading operation of the apparatus, and wherein the largest specimen comprises a data record member formed by a thermoplastic film recording medium supported over an electrically conducting surface that is in turn supported by a suitable electrically insulating backing member with the thermoplastic film recording medium having electrical charges recorded thereon in intelligence conveying patterns, scanning means positioned adjacent the projected electron path intermediate the electron gun and the data record for scanning the finely focussed electron beam over the surface of the data record member, means for operatively coupling a scanning signal source to said scanning means for controlling the action thereof, and means for removing and replacing the data record member with a replacement data record member having different intelligence conveying patterns of electrical charges recorded thereon, a fluorescent screen positioned substantially at the image plane of the turned around electrons for converting the variations in the turned around electrons into time varying intensity light flashes, and photo-electric means positioned to view the fluorescent screen for converting the time varying light flashes into a time varying electric output signal representative of the variations in the data record.

20. The combination set forth in claim 6 wherein the combination is further characterized by an electron gun, an electron source, a control grid, and an accelerating anode electrode, a writing signal source and a control grid reading bias signal source, selective switching means for selectively connecting said control grid to said writing signal source and to said control grid reading bias signal source, a writing high voltage supply and a reading high voltage supply, selective switching means for selectively connecting said accelerating anode to the writing high voltage supply and to the reading high voltage supply, a variable source of potential operatively coupled to the target specimen for selectively applying an accelerating potential and a reversing potential to the specimen, and write-read control switch means interconnecting both said selective switching means and said variable source of potential for selectively and simultaneously supplying said writing signal to the control grid, said writing high voltage to the accelerating anode, and an accelerating potential to the specimen during the writing operation, and for selectively and simultaneously supplying said control grid reading bias signal to the control grid, said reading high voltage to the accelerating anode, and a reversing potential to the specimen during the reading operation of the apparatus, and wherein the largest specimen comprises a data record member formed by a thermoplastic film recording medium supported over an electrically conducting surface that is in turn supported by a suitable electrically insulating backing member with the thermoplastic film recording medium having electrical charges recorded thereon in intelligence conveying patterns, scanning means positioned adjacent the projected electron path intermediate the electron gun and the data record for scanning the finely focussed electron beam over the surface of the data record member, means for operatively coupling a scanning signal source to said scanning means for controlling the action thereof, and means for removing and replacing the data record member with a replacement data record member having different intelligence conveying patterns of electrical charges recorded thereon, and an electron multiplier positioned substantially at the image plane of the turned around electrons for directly converting the variations in the turned around electrons into a time varying electric output signal representative of the variations in the data record.

References Cited by the Examiner

UNITED STATES PATENTS

| | | | |
|---|---|---|---|
| 2,264,709 | 12/1941 | Nicoll | 250—49.5 |
| 2,330,930 | 10/1943 | Snyder | 250—49.5 |
| 2,799,779 | 7/1957 | Weissenberg | 250—49.5 |
| 2,901,627 | 8/1959 | Wiskott et al. | 250—49.5 |
| 3,168,726 | 2/1965 | Boblett | 178—6.6 |

DAVID G. REDINBAUGH, *Primary Examiner.*

R. L. RICHARDSON, *Assistant Examiner.*